United States Patent
Velusamy et al.

(10) Patent No.: US 10,542,575 B1
(45) Date of Patent: Jan. 21, 2020

(54) CONTROLLING INITIATION OF DEDICATED BEARER SETUP FOLLOWING FAILED DEDICATED BEARER SETUP

(71) Applicant: Sprint Spectrum L.P., Overland Park, KS (US)

(72) Inventors: Saravana Velusamy, Olathe, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 392 days.

(21) Appl. No.: 15/221,288

(22) Filed: Jul. 27, 2016

(51) Int. Cl.
*H04W 76/18* (2018.01)
*H04W 28/02* (2009.01)
*H04M 7/00* (2006.01)
*H04W 40/22* (2009.01)
*H04W 60/04* (2009.01)
*H04W 88/04* (2009.01)

(52) U.S. Cl.
CPC ......... *H04W 76/18* (2018.02); *H04M 7/0084* (2013.01); *H04W 28/0263* (2013.01); *H04W 40/22* (2013.01); *H04W 60/04* (2013.01); *H04W 88/04* (2013.01)

(58) Field of Classification Search
CPC ............... H04W 76/18; H04W 76/027; H04W 28/0263; H04W 40/22; H04W 60/04; H04W 88/04; H04M 7/0084
See application file for complete search history.

(56) References Cited

U.S. PATENT DOCUMENTS

| | | | | |
|---|---|---|---|---|
| 2010/0182912 | A1* | 7/2010 | Hongisto | H04L 47/15 370/242 |
| 2013/0016649 | A1* | 1/2013 | Damnjanovic | H04W 88/04 370/315 |
| 2013/0070594 | A1* | 3/2013 | Garcia Martin | H04W 28/08 370/235 |
| 2014/0010180 | A1* | 1/2014 | Lee | H04W 72/04 370/329 |
| 2015/0117300 | A1* | 4/2015 | Nam | H04L 1/1819 370/315 |
| 2015/0351147 | A1 | 12/2015 | Jain et al. | |
| 2016/0029228 | A1* | 1/2016 | Mufti | H04W 24/04 370/225 |
| 2016/0212668 | A1* | 7/2016 | Castro Castro | H04L 47/20 |
| 2017/0094565 | A1* | 3/2017 | Sharma | H04W 76/18 |

* cited by examiner

*Primary Examiner* — Hashim S Bhatti
*Assistant Examiner* — Abdullahi Ahmed

(57) ABSTRACT

Disclosed are methods and systems for managing air interface communications between a base station and a user equipment device (UE). When setup of a dedicated bearer connection between a base station and a UE served by the base station fails, setup of the dedicated bearer connection can be re-initiated responsive to determining that, following the failure, a threshold extent of dedicated bearer connections have been successfully set up between base station and one or more other UEs.

16 Claims, 5 Drawing Sheets

CONTROLLING INITIATION OF DEDICATED BEARER SETUP FOLLOWING FAILED DEDICATED BEARER SETUP

BACKGROUND

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may be a "default bearer" or a "dedicated bearer" and may include a radio-bearer component that extends between a UE and a serving base station and an access-bearer component that extends between the serving base station and the transport network.

A dedicated bearer is a bearer on which the network is configured to give special treatment for communications. For instance, a dedicated bearer may provide a quality of service (QoS) having a "guaranteed bit rate" such that traffic delivered over the dedicated bearer may be delivered at the guaranteed bit rate or higher. A default bearer, on the other hand, is a bearer on which the network routes traffic with the best quality available at a given time (i.e., a "best effort" QoS). With a best effort service, a bit rate and/or delivery time of traffic delivered over the default bearer may vary based on a current traffic load of the network.

Further, both dedicated and default bearers may have a particular priority level based on a QoS class identifier (QCI) of each bearer, for instance. As such, in situations where the network is unable to accommodate delivery of traffic (e.g., due to a high volume of network traffic), the network may discard traffic on a lower priority bearer before discarding traffic on a higher priority bearer. Thus, in order to give special treatment to certain dedicated bearer traffic, some dedicated bearers may have a higher priority level than some default bearers.

In practice, the network may allocate a number of default and/or dedicated bearers for a UE to support various different types of communication services. By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

In turn, as a UE is being served by a base station, if the UE is going to engage in another type of communication service, the network may allocate for the UE still other bearers, such as a dedicated bearer. For instance, if the UE supports VoIP service and seeks to engage in a VoIP call, or a VoIP call server seeks to connect a call to the UE, the network may allocate for the UE a dedicated bearer having a guaranteed bit rate, and perhaps other high service level attributes, to carry the Val' bearer traffic (e.g., packets representing voice), and the UE may then engage in the Val' call via that bearer. Other examples are possible as well. Further, at the time of bearer establishment, the network may provide a traffic flow template (TFT) to a UE and its serving base station. Among other things, the TFT may indicate which traffic should be transmitted on the UE's dedicated bearer(s) and which traffic should be transmitted on the UE's default bearer(s).

OVERVIEW

In a wireless communication network such as the one described above, there may be times when the network is not capable of establishing a dedicated bearer for a UE. For instance, network infrastructure vendors may impose a limit on the number of simultaneous bearers that a base station and/or the network will support. Consequently, a base station may be unable to establish additional dedicated bearers once such a limit has been reach. Further, a base station may have a limited extent of air interface resources for serving UEs. As noted above, certain dedicated bearers may be configured to provide a guaranteed bit rate service, which may require a minimum extent of a base station's air interface resources. Consequently, a base station may be unable to establish an additional dedicated bearer if the extent of the base station's available air interface resources is insufficient to support the quality of service required by the dedicated bearer.

In any case, when the network fails to establish a dedicated bearer for a UE, traffic to or from the UE that would typically be delivered over the dedicated bearer may instead be rerouted to be delivered over a default bearer of the UE. However, rerouting traffic to a UE's default bearer may result in a poor user experience. As noted above, a default bearer provides a best effort quality of service rather than a guaranteed bit rate quality of service, and traffic delivered over a default bearer may have a lower priority level than traffic delivered over a dedicated bearer. As such, there may be times when the rerouted traffic is delivered at a low bit rate or even completely discarded in order to accommodate delivery of other higher priority traffic. This may be particularly problematic if the rerouted traffic includes certain high priority communications, such as control signaling for managing service to UEs.

In practice, for instance, a relay base station could include or be interconnected with a UE module (e.g., a relay-UE) that is served by a donor base station and for which the network establishes one or more bearers. As such, the relay-UE may provide wireless backhaul connectivity to facilitate communication between the relay base station and the core network. As with typical non-relay UEs, when the relay-UE attaches with the network, the network may set up a default bearer for the relay-UE. Further, the network may be arranged to set up for the relay-UE a dedicated bearer to be used for control signaling (e.g., "control-plane signaling") to and from the relay base station. However, due to congestion or other issues as noted above, the network may fail to set up the dedicated bearer, and so the control signaling could end up being communicated on the relay-UE's default bearer without high priority treatment. Other examples are possible as well.

Accordingly, when the network fails to establish a dedicated bearer for a UE, it may be desirable to, at some point, re-initiate setup of the dedicated bearer. However, as noted in the example above, dedicated bearer setup for a relay-UE, for instance, may occur when the relay-UE first attaches with the network. As such, the network may not re-initiate setup of a dedicated bearer for the relay-UE until the relay-UE re-attaches with the network. Such re-attachment could be several hours or days after the failed dedicated bearer setup, during which time high priority traffic may continue to be delivered over the relay-UE's default bearer. Consequently, an improvement is desired.

Disclosed herein is a method and system that may help to address this or other issues. In accordance with the disclosure, when a base station fails to establish a dedicated bearer connection for a UE, a network entity such as a packet data network gateway (PGW) may re-initiate setup of the dedicated bearer for the UE upon detecting certain conditions. In particular, the network entity may re-initiate setup of the dedicated bearer in response to determining that the base station has, after the failed dedicated bearer setup, successfully established a threshold extent of dedicated bearers. In this manner, the network may re-initiate setup of the dedicated bearer without waiting for an attachment request or some other dedicated bearer setup request from the UE. Further, by initiating setup of the dedicated bearer upon detecting the threshold extent of successful dedicated bearer setups, the likelihood of success for establishing the dedicated bearer may be increased. For instance, the threshold extent of successful dedicated bearer setups may indicate that the base station is no longer congested and is thus capable of establishing one or more new dedicated bearers.

Accordingly, in one respect, disclosed is a method for managing air interface communication between a base station and a user equipment device (UE) served by the base station. In accordance with the disclosure, the method involves initiating setup of a dedicated bearer connection between the UE and the base station and detecting failure of the initiated setup of the dedicated bearer connection. Further, the method involves determining that, following the detected failure, a threshold extent of dedicated bearer connections have been successfully set up between one or more other UEs and the base station and, based at least on the determining, re-initiating setup of the dedicated bearer connection between the UE and the base station.

In another respect, disclosed is a PGW operable in an access network, where the access network comprises a base station configured to serve a user equipment device (UE) over an air interface, and where the PGW is configured to provide connectivity between the UE and a packet-switched network. In accordance with the disclosure, the PGW includes a processing unit, non-transitory data storage, and program instructions stored in the non-transitory data storage and executable by the processing unit to cause the PGW to carry out operations. Such operations include initiating setup of a dedicated bearer connection between the UE and the base station and detecting failure of the initiated setup of the dedicated bearer connection. The operations further include determining that, following the detected failure, a threshold extent of dedicated bearer connections have been successfully set up between one or more other UEs and the base station and, based at least on the determining, re-initiating setup of the dedicated bearer connection between the UE and the base station.

And in still another respect, disclosed is a method operable in an access network comprising a donor base station and a relay, where the relay comprises a relay user equipment device (relay-UE) and a relay base station, where the donor base station is configured to serve the relay-UE over an air interface defining a wireless backhaul connection for the relay, and where the relay base station is configured to serve one or more UEs. In accordance with the disclosure, the method involves detecting an attach request sent from the relay-UE to the donor base station and, responsive to detecting the attach request, initiating setup of (i) a default bearer connection for user-plane traffic communicated between the donor base station and the relay-UE and (ii) a dedicated bearer connection for control-plane traffic communicated between the donor base station and the relay-UE. Further, the method involves detecting failure of the initiated setup of the dedicated bearer connection and determining that, following the detected failure, a threshold extent of dedicated bearers have been successfully set up for one or more other UEs served by the donor base station. The method further involves, based at least on the determining, re-initiating setup of the dedicated bearer connection for control-plane traffic communicated between the donor base station and the relay-UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present methods and systems will be described herein in the context of LTE as an example radio access protocol and associated network arrangement. However, it will be understood that principles of the disclosure can extend to apply in other scenarios as well, such as with respect to other radio access protocols, examples of which include Orthogonal Frequency Division Multiple Access (OFDMA) (e.g., Wireless Interoperability for Microwave Access (WiMAX)), Code Division Multiple Access (CDMA), Global System for Mobile Communications (GSM), and others now known or later developed. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
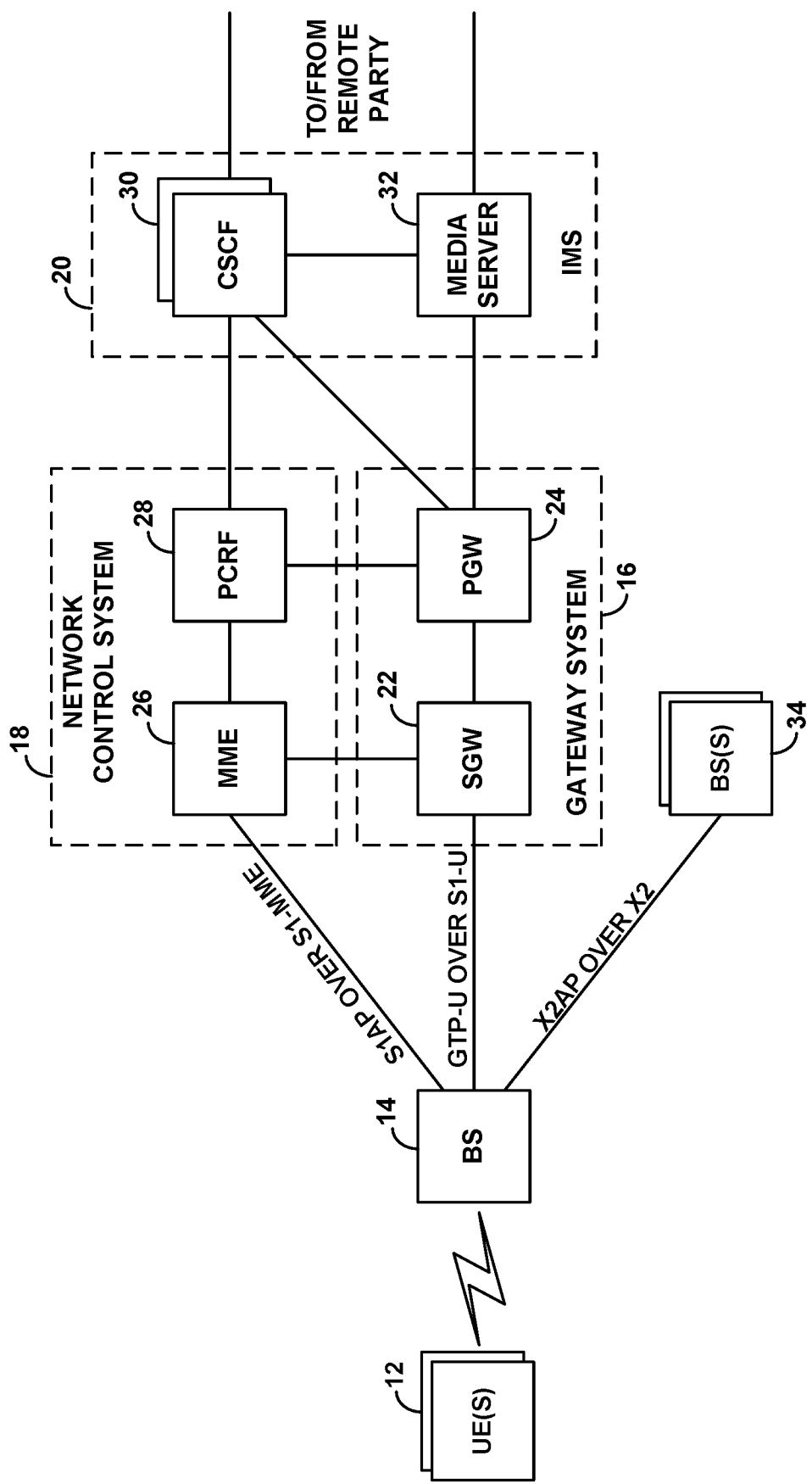
FIG. 1 is a simplified block diagram of an example wireless communication system.

Referring to the drawings, as noted above, FIG. 1 is a simplified block diagram of an example network arrangement in which the features of the present disclosure can be implemented. As shown in FIG. 1, the example arrangement includes one or more UEs 12, a base station 14, a gateway system 16, a network control system 18, and an Internet Multimedia Subsystem (IMS) 20. The gateway system 16 may include a serving gateway (SGW) 22 and a packet data network gateway (PGW) 24, and the network control system 18 may include a mobility management entity (MME) 26 and a policy charging and rules function (PCRF) 28. As shown, these various network entities have communication interfaces with each other. In practice, for instance, the entities may all sit as nodes on a core packet network operated by a wireless service provider, and the illustrated interfaces may thus be logical packet-data connections through that network so that the entities can engage in IP communication with each other.

The base station 14 may be an LTE evolved-Node-B (eNodeB) and could take the form of a macro base station, a small cell base station (e.g., femtocell) or the like. As such, the base station would include an antenna structure, power amplifier, and associated components for radiating to provide a coverage area in which to serve UEs such as example UE 12. Further, base station 14 has logical communication interfaces (e.g., virtual tunnels through the core network) through which base station 14 engages in communication with various other ones of the core network entities. Some of these interfaces may be established for general use by the base station 14, and other interfaces may be established as needed for use to serve individual UEs. For instance, base station 14 may have a generally established X2 interface respectively with each adjacent base station 34. And for each served UE, base station 14 may have an S1-MME interface with an MME 26 and an S1-U interface with an SGW 22.

In practice, communications over these and other interfaces to and from base station 14 may include both control-plane communication and user-plane communication. In the arrangement shown, for instance, control-plane communication may include signaling with MMEs according to the S1 application protocol (S1AP) (e.g., per 3GPP TS 36.413), such as control signaling for radio bearer management, S1 interface management, initial context transfer, non-access stratum (NAS) signaling transport, locating reporting, MME-based handover or mobility management, inter-cell interference coordination, and paging, among other functions. Further, control-plane communication could also include signaling with adjacent base stations 34 according to the X1 application protocol (X2AP) (e.g., per 3GPP TS 36.423), such as control signaling for inter-base station handover or mobility management, load management, X2 interface management, coordinated multipoint service, and base station configuration updating.

User-plane communication in the example arrangement is then communication of user data, such as UE bearer data communications flowing between the UE and an external packet-switched network. Such user-plane communication may pass between entities of the core network according to the General Packet Radio Service (GPRS) tunneling protocol (GTP), with user data being encapsulated in GTP headers. For instance, when packet data destined to a particular UE arrives over a packet-switched network at a PGW, the PGW may encapsulate the packet data in GTP-U packets and pass the GTP-U packets to an SGW, the SGW may pass the GTP-U packets over an S1-U interface to a base station, and the base station may transmit the underlying packet data over the air interface to the UE 12. Likewise, when a base station receives packet data from a UE, the base station may encapsulate the packet data in GTP-U packets and pass the GTP-U packets to an SGW, the SGW may pass the GTP-U packets to a PGW, and the PGW may output the underlying packet data onto a packet-switched network.

FIG. 1 depicts some of this control-plane and user-plane communication by way of example. In particular, FIG. 1 depicts (i) S1AP control-plane communication over an S1-MME interface between base station 14 and MME 26, (ii) GTP-U user-plane communication over an S1-U interface between base station 14 and SGW 22, and (iii) X2AP control-plane communication over an X2 interface between base station 14 and one or more adjacent base stations 34. Various other examples of control-plane communication and user-plane communication may be possible as well.

In operation, the gateway system 16 functions to provide connectivity with a transport network such as the public Internet or other packet-switched network so as to facilitate UE communication with entities on the packet-switched network. In the example arrangement, SGW 22 functions as an interface between base station 14 and PGW 24, and PGW 24 functions to provide ultimate connectivity with a packet-switched network. Thus, PGW 24 (and gateway system 16 as a whole) provides for communication with the IMS 20. Further, the network control system 18 functions to control certain operations of base station 14 and gateway system 16. For instance, the MME 26 functions to manage signaling between base station 14 and SGW 22 for setup of bearers, and the PCRF 28 functions as a policy server to manage operation of PGW 24.

The IMS 20 is then shown including one or more call session control functions (CSCFs) 30 and a media server 32, which may similarly sit as nodes on a packet-switched network. Further, CSCFs 30 are shown having interfaces with PCRF 28 and with PGW 24, and media server 32 is shown having an interface with PGW 24. In operation, the CSCFs 30 function as SIP proxy servers, to facilitate signaling for setup of packet-based real-time media sessions, and the media server 32 may function to communicate packet-based real-time media (such as voice, video, or the like) with various served parties.

In practice with this arrangement, when a UE first enters into coverage of a base station, the UE may engage in access signaling and radio resource control (RRC) signaling with the base station to establish for the UE a radio-link-layer connection or "RRC connection" between the UE and the base station, and the UE may transmit via the RRC connection to the base station an attach request message, which the base station may forward to the MME.

After authorizing and authenticating the UE for service (e.g., through interaction with a home subscriber server (not shown)), the MME may then engage in signaling with the base station and the SGW to set up one or more default bearers for the UE. Each bearer may have a particular service level, possibly designated by a Quality of Service Class Identifier (QCI) value, wherein a lowest QCI value corresponds to a highest service level such as a high guaranteed bit rate, whereas a highest QCI value corresponds with a lowest service level such as best-efforts communication. One such default bearer may be a best-efforts bearer for carrying general IP communications at low service level (e.g., QCI 8 or 9). Further, for a UE that subscribes to IMS service, another such default bearer may be an IMS signaling bearer for carrying SIP signaling between the UE and the IMS at a medium service level (e.g., QCI 5).

To set up each such bearer, the MME may work with the base station and SGW to establish a logical tunnel between base station and SGW, and the SGW may responsively work with the PGW to establish a logical tunnel between the SGW and the PGW. For instance, the MME 26 may engage in signaling with the SGW to determine for the bearer a tunnel endpoint at the SGW and to prepare the SGW to communicate over the tunnel at the desired service level. And the MME may transmit to the base station a bearer setup request that specifies the SGW tunnel endpoint identity and the bearer service level, likewise preparing the base station to communicate over the tunnel at the desired service level. Further, the SGW may similarly engage in signaling with the PGW to establish for the bearer a tunnel between the SGW and the PGW and to prepare the PGW to communicate over the tunnel at the desired service level, and the PGW may assign an IP address for the UE, which may pass in return signaling to the base station for transmission in an attach response message to the UE.

Upon receipt of each bearer setup request from the MME (or a consolidated request for multiple such bearers being established at once), the base station may then also work to manage air interface allocation for the UE's radio-link-layer connection, to be consistent with the indicated bearer service level. For instance, depending on the bit rate to be provided for the bearer, and considering the base station's level of load (e.g., how many other UEs the base station is currently serving, and so forth), the base station may decide that it would be appropriate to add one or more additional carriers to the UE's radio-link-layer connection (e.g., to increase the spectrum and thus the number of resource blocks that could be used for data communication to or from the UE) or to switch the UE's carrier to a different carrier (e.g., to provide different frequency bandwidth). To make any such changes to the UE's radio-link-layer connection, the base station may engage in RRC connection reconfiguration signaling with the UE, to prepare the base station and UE to operate accordingly.

As discussed above, in addition to establishing one or more best-effort default bearers for a UE, the network may also establish for the UE one or more dedicated bearers that provide special treatment for certain communications. For example, the UE may at some point use the IMS signaling bearer to request a new IMS-based communication session such as a VoIP call, which may then trigger the network to establish a new dedicated bearer for the requested communication session. This process may take various forms.

In the arrangement of FIG. 1, for instance, if UE 12 seeks to establish a VoIP call with a remote party, the UE 12 may transmit via its radio-link-layer connection and IMS signaling bearer to the IMS 20 a SIP INVITE requesting setup of the call. In that SIP INVITE, the UE 12 may indicate in accordance with the Session Description Protocol (SDP) various codecs (e.g., analog-digital conversion algorithms) that the UE 12 supports for use in voice communication. Examples of such codecs might include, for instance, G.723.1, G.711, G.729a, and other codecs now known or later developed. Further, the UE 12 may include in the SIP INVITE a preconditions-supported parameter that functions to postpone ringing until setup of an appropriate bearer for the call. This SIP INVITE may then pass in the IMS 20 to one or more proxy-CSCFs (P-CSCFs) and ultimately to the remote party. And the remote party may then reply with a SIP 183 SESSION PROGRESS that carries an SDP indication of one or more codecs supported by the remote party and that also carries a pre-conditions supported parameter.

Once a P-CSCF of the IMS has thus received indications of both parties' supported codecs, the P-CSCF may then select a highest agreed codec (the highest quality codec that both parties support) and may then engage in signaling with the PCRF 28 to arrange for setup of a VoIP bearer for the UE 12. (Likewise, the same or another P-CSCF may similarly select a highest agreed codec and may work to set up a VoIP connection with the remote party.) In particular, the P-CSCF may transmit to the PCRF 28 a DIAMETER Rx message that identifies the UE 12 and the remote party and that specifies the bit rate needed for a bearer in accordance with the selected codec. And the PCRF 28 may then invoke setup of a dedicated bearer with a QCI level corresponding with the indicated bit rate. In particular, the PCRF 28 may transmit to the PGW 24 a DIAMETER Rx message commanding the PGW 24 to set up such a dedicated bearer, which would likely be a QCI 1 bearer for VoIP communication.

Upon receipt of the bearer-establishment directive from the PCRF 28, the PGW 24 may then engage in bearer setup signaling with the SGW 22, the SGW 22 may then responsively engage in bearer setup signaling with the MME 26, and the MME 26 may then responsively engage in bearer setup signaling with the base station 14. Through this signaling, as in the process discussed above, a tunnel may be established for the bearer between the base station 14 and the SGW 22 and between the SGW 22 and the PGW 24, with the base station 14, SGW 22, and PGW 24 being configured to communicate over the bearer at the indicated QCI level.

Further, in response to receipt from the MME 26 of a bearer setup request requesting set up of this dedicated bearer, the base station 14 may then manage air interface resource allocation to the UE 12 to be sure the UE's radio-link-layer connection is of a scope consistent with the dedicated bearer service level. As in the process discussed above, for instance, the base station 14 may consider the required bit rate, the base station's overall load, and the capacity of one or more carriers on which the base station 14 is currently set to serve the UE 12 (i.e., encompassed by the UE's radio-link-layer connection), and the base station 14 may thereby decide if it would be appropriate to expand or contract the scope of the UE's radio-link-layer connection for consistency with the dedicated bearer service level. For instance, if the dedicated bearer has a minimum guaranteed bit rate, then the base station 14 may decide to add one or more additional carriers to the UE's radio-link-layer connection to ensure that the base station 14 has sufficient air interface resources to serve the UE 12 at the guaranteed bit rate on the dedicated bearer.

Once the bearer is set up for the UE 12 and the UE's radio-link-layer connection is of a scope consistent with the dedicated bearer service level, the MME 26 may then engage in further signaling with the SGW 22, and the SGW 22 may engage in further signaling with the PGW 24, completing the dedicated bearer setup process.

Further, the PGW 24, or some other network entity, may maintain in a database a bearer setup log. The bearer setup log may include information indicative of a history of bearer setup attempts and whether each setup attempt was successful. For instance, the bearer setup log may include a list of base station identifiers, such as a list of IP addresses assigned to each base station. Each base station identifier may further be associated with bearer setup information related to a dedicated bearer setup attempt involving the base station that corresponds to that particular identifier. For instance, the bearer setup information may include a timestamp indicating a time of the setup attempt, a UE identifier (e.g., an IP address of a UE) indicating a UE for which the dedicated bearer setup was initiated, a QCI value of the dedicated bearer, and/or information indicating whether the dedicated bearer setup attempt was successful. The bearer setup log may include other information as well. As such, the PGW 24 may refer to its bearer setup log to determine a bearer setup history of a particular base station or UE.

Figure 2:
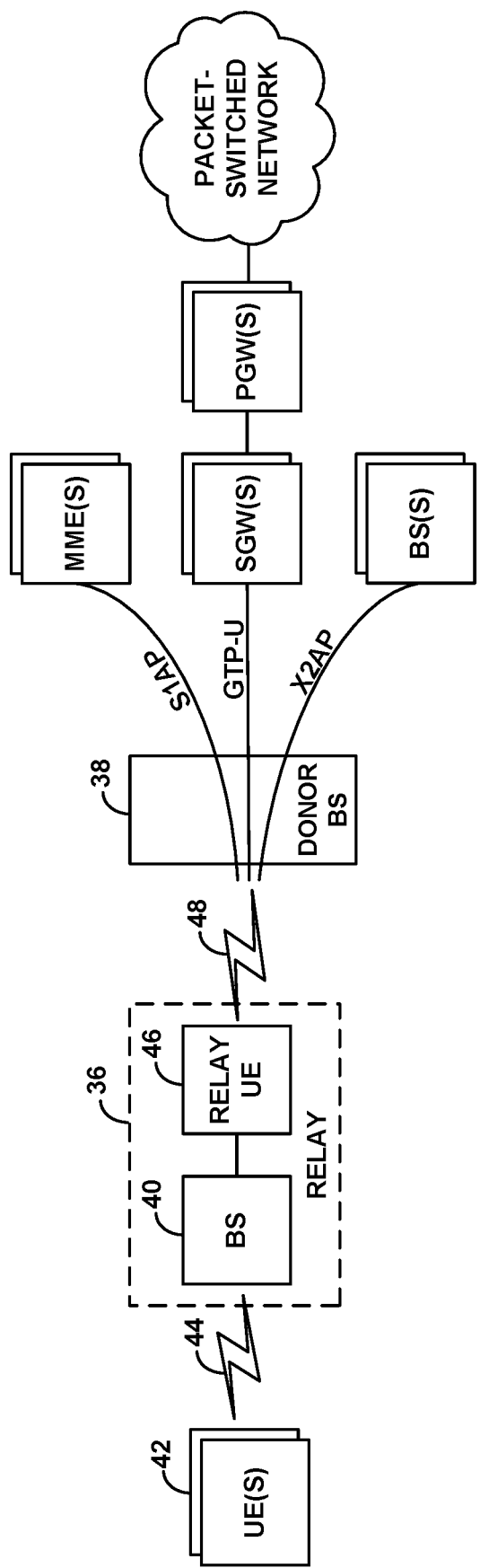
FIG. 2 is a simplified block diagram of an enhanced wireless communication system including a relay.

Turning next to FIG. 2, an enhancement of the arrangement of FIG. 1 is shown. In this enhanced arrangement, the LTE network additionally includes a relay 36, which has a wireless backhaul connection with a donor base station 38. In particular, relay 36 includes a relay base station 40 configured to serve UEs 42 over an air interface 44 much like base station 14 discussed above, and relay 36 further includes a relay-UE 46 that is attached with and served by donor base station 40 over an air interface 48 defining the wireless backhaul connection.

With this arrangement, relay base station 40 may engage in control-plane communication and user-plane communication with various core network entities in the same way as base station 14 would, but those control-plane and user-plane communications would pass over the wireless backhaul connection provided by donor base station 38 that serves the relay-UE 46, and between relay-UE 46 and relay base station 40. Thus, when the relay base station 40 engages in S1AP, X2AP, or GTP-U communication with other core network entities as described above, those communications would pass via the relay-UE 46, via the wireless backhaul communication over air interface 48, via donor base station 38, and likely via a special SAE gateway system in the core network. As result, with this arrangement, the communications passing over the air interface between donor base station 38 and relay-UE 46 may include both control-plane communications with relay base station 40 and user-plane communication with one or more UEs 42 served by the relay base station.

In practice, when relay-UE 46 attaches with donor base station 38, the network may be configured to identify relay-UE 46 as a relay-UE (e.g., based on a profile record of relay-UE 46) rather than an end-user UE (i.e., non-relay-UE) and responsively set up both a default bearer connection (that provides a best effort service) and a dedicated bearer connection (that provides special treatment, such as a guaranteed bit rate and/or a high priority level) for relay-UE 46. Such bearers may be set up according to the process described above to establish a logical tunnel between the PGW and the SGW, between the SGW and the donor base station 38, and between the donor base station 38 and the relay-UE 46.

Once the default and dedicated bearers are set up for relay-UE 46, user-plane traffic may be sent exclusively over the default bearer, and control-plane traffic may be sent exclusively over the dedicated bearer. For instance, when working to set up the dedicated bearer, the PGW may send to the SGW a TFT indicating that control-plane traffic should be transmitted on the dedicated bearer and that user-plane traffic should be transmitted on the default bearer. The TFT may then be sent from the SGW to the MME, from the MME to the donor base station 38, and from the donor base station 38 to the relay-UE 46. Responsive to receiving the TFT, both the donor base station 38 and the relay-UE 46 could be configured to determine whether traffic to be communicated between the donor base station 38 and the relay-UE 46 is control-plane traffic or is rather user-plane traffic (e.g., based on a QCI value associated with the traffic), and, based on that determination, to communicate the traffic through one bearer or the other. Thus, if the determination is that the traffic is control-plane traffic, then the donor base station and relay-UE could responsively communicate that traffic through the dedicated bearer, but if the determination is that the traffic is user-plane traffic, then the donor base station and relay base station could responsively communicate that traffic through the default bearer.

However, in line with the discussion above, there may be times when a base station, such as base station 12 or donor base station 38, will not be capable of establishing a new dedicated bearer. For instance, network infrastructure vendors may impose a limit on the number of simultaneous bearers that a base station and/or the network will support, such as a limit on a total number of bearers and/or a limit on a number of bearers for each respective QCI level. Additionally, a base station may have a limited extent of air interface resources for serving UEs. If the base station's congestion has risen to a level where one of these limits has been reached, the base station may be incapable of establishing the new dedicated bearer and may thus need to reject the bearer setup request. This may give rise to an undesirable scenario in which traffic intended for the new dedicated bearer is rerouted through the UE's default bearer. Further, as noted above, such traffic may continue to be rerouted through the default bearer until the network receives another dedicated bearer setup request at some subsequent time (e.g., when the UE re-attaches with the network). Disclosed herein are methods and systems to help address this issue.

Figure 3:
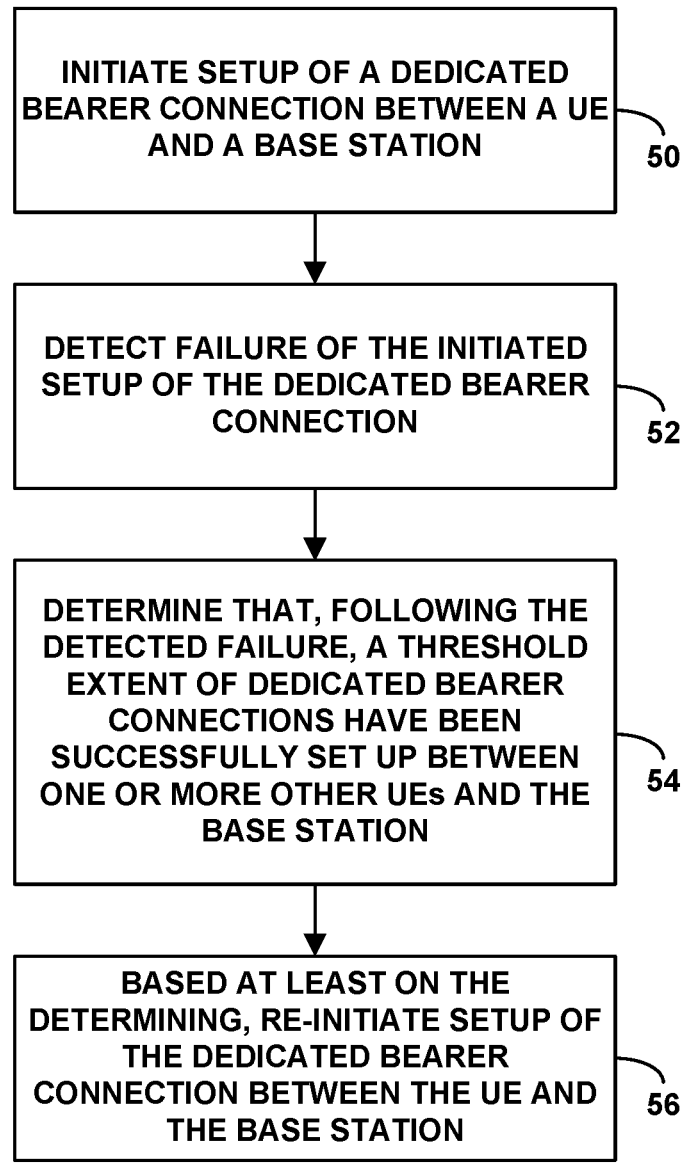
FIG. 3 is a flow chart depicting operations in accordance with the disclosure.

FIG. 3 is a flow chart depicting a method that can be carried out in accordance with the present method. This method may be carried out in an arrangement such as those shown in FIGS. 1 and 2, where a base station serves a UE over an air interface and is arranged to communicate with a gateway system that provides connectivity with a transport network. Functions of the method may be carried out by various entities of a wireless communication network, such as by a PGW possibly in cooperation with one or more other entities for instance.

As shown in FIG. 3, at block 50, the method involves a PGW, or some other network entity, initiating setup of a dedicated bearer connection between a UE and a base station. In line with the discussion above, this may involve the PGW carrying out one or more functions to establish the logical tunnel between the UE and the base station. For instance, initiating setup of the dedicated bearer connection may include the PGW working to establish a logical tunnel between the SGW and the PGW and/or the PGW causing the MME to transmit to the base station a bearer setup request that specifies the SGW tunnel endpoint identity and the bearer service level to prepare the base station to communicate over the tunnel at the desired service level. Further, setup of the dedicated bearer connection may be initiated, for example, in response to receiving a request to set up the dedicated bearer connection (e.g., based on a request from an IMS server to set up a dedicated bearer for a VoIP call) or in response to the UE attaching with the network.

Next at block 52, the PGW, or some other network entity, detects failure of the initiated setup of the dedicated bearer connection. In line with the discussion above, the base station may have a limited extent of air interface resources and/or a limited number of dedicated bearers that the base station can maintain at any given time. Accordingly, if the base station's congestion has risen to a level where one of these limits has been reached, the base station may be incapable of establishing the new dedicated bearer and may thus need to reject the bearer setup request. When rejecting the bearer setup request, the base station may send a reject message to the MME, perhaps with a cause-code indicating why the base station did not accept the bearer setup request. The MME may then send a reject message to the SGW, perhaps with a cause-code indicating that the base station declined the setup request. And the SGW may then send a reject message to the PGW, perhaps with a cause-code indicating that the base station declined the setup request. As such, failure of the initiated setup of the dedicated bearer connection may be detected by one or more network entities, such as the PGW, the SWG, or the MME, based on receiving one or more of these reject messages and/or cause codes.

At block 54, the PGW, or some other network entity, determines that, following the detected failure, a threshold extent of dedicated bearer connections have been successfully set up between one or more other UEs and the base station. In line with the discussion above, the PGW may refer to its bearer setup log to determine a bearer setup history of a particular base station or UE. Thus, the PGW may refer to its bearer setup log to identify a UE and a corresponding base station for which dedicated bearer setup failed, as well as a timestamp of the failure. The PGW may then determine, based on its bearer setup log, an extent of dedicated bearer connections that have been successfully set up between the corresponding base station and one or more other UEs that are different from the identified UE. For instance, the PGW may determine a total number of the base station's dedicated bearers that were set up following the failed bearer setup. Alternatively, the PGW may determine a number of the base station's dedicated bearers having a particular QCI value that were set up following the failed bearer setup. Other examples are possible as well.

The PGW may then determine whether, following the detected failure, a threshold extent of dedicated bearer connections have been successfully set up between one or more other UEs and the base station. For instance, the threshold extent may be a particular number of total dedicated bearers or dedicated bearers having a particular QCI value. Thus, based on determining that at least the particular number of total dedicated bearers or dedicated bearers having the particular QCI value have been set up between the base station and its served UEs following the detected failure, the PGW may determine that the threshold extent of dedicated bearer connections have been successfully set up. Other examples are possible as well.

At block 56, the PGW, or some other network entity, re-initiates setup of the dedicated bearer connection between the UE and the base station based at least on determining that the threshold extent of dedicated bearer connections have been successfully set up, following the detected failure of the dedicated bearer setup, between one or more other UEs and the base station. In line with the discussion above, for instance, responsive to making such a determination, the PGW may engage in bearer setup signaling with the SGW, the SGW may then responsively engage in bearer setup signaling with the MME, and the MME may then responsively engage in bearer setup signaling with the base station. The base station may then manage air interface resource allocation to the UE to establish the radio-bearer component of the dedicated bearer connection.

In some examples, the PGW may be further configured to determine whether the UE is a relay-UE or an end-user UE, for instance, based on a service profile of the UE. As such, the PGW may be further configured to re-initiate setup of the dedicated bearer connection between the UE and the base station only if the PGW determines that the UE is a relay-UE rather than an end-user UE. Thus, the PGW may re-initiate setup of the dedicated bearer connection responsive to determining that both (i) the UE is a relay-UE rather than an end-user UE and (ii) following the detected dedicated bearer setup failure, the threshold extent of dedicated bearer connections have been successfully set up between one or more other UEs and the base station.

Figure 4:
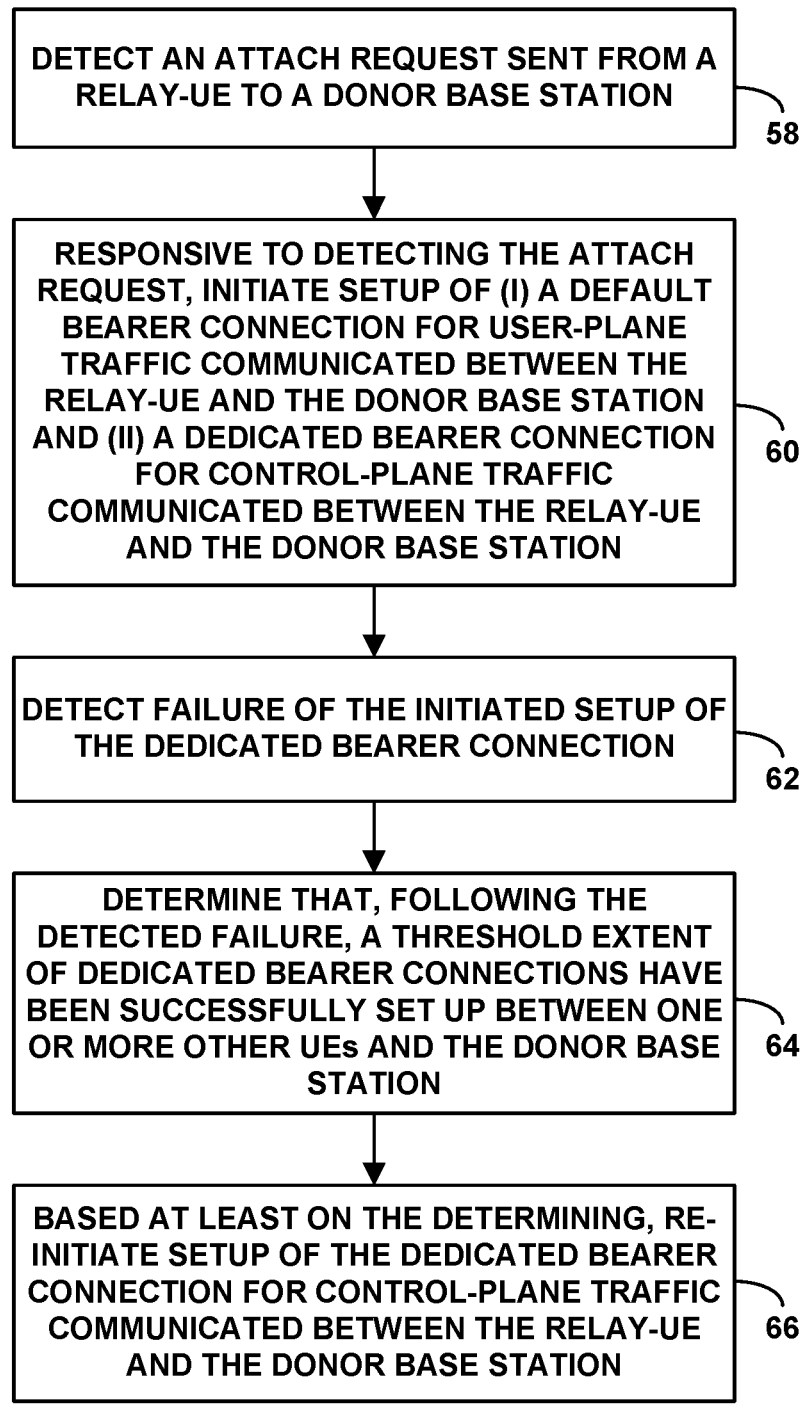
FIG. 4 is a flow chart depicting operations in accordance with the disclosure.

Referring next to FIG. 4, another flow chart depicting a method that can be carried out in accordance with the present method is shown. At block 58, the method involves a PGW, or some other network entity, detecting an attach request sent from a relay-UE to a donor base station. At block 60, responsive to detecting the attach request, the PGW initiates setup of (i) a default bearer connection for user-plane traffic communicated between the relay-UE and the donor base station and (ii) a dedicated bearer connection for control-plane traffic communicated between the relay-UE and the donor base station. In line with the discussion above, the PGW, or some other network entity, may be configured to identify the relay-UE as a relay-UE rather than an end-user UE and responsively set up a dedicated bearer connection in addition to a default bearer connection for the relay-UE. For instance, when establishing the dedicated bearer, the PGW may send a TFT to the donor base station and the relay-UE. Based on the TFT, the donor base station and the relay-UE could be configured to determine whether traffic to be communicated between the donor base station and the relay-UE is control-plane traffic or is rather user-plane traffic, and, based on that determination, to communicate the traffic through one bearer or the other.

Next at block 62, the PGW, or some other network entity, detects failure of the initiated setup of the dedicated bearer connection. At block 64, the PGW determines that, following the detected failure, a threshold extent of dedicated bearer connections have been successfully set up between one or more other UEs and the donor base station. And at block 66, responsive to making such a determination, the PGW re-initiates setup of the dedicated bearer connection for control-plane traffic communicated between the relay-UE and the donor base station. These acts may be carried out according to the same or similar procedures discussed above with respect to blocks 52, 54, and 56 of FIG. 3.

Figure 5:
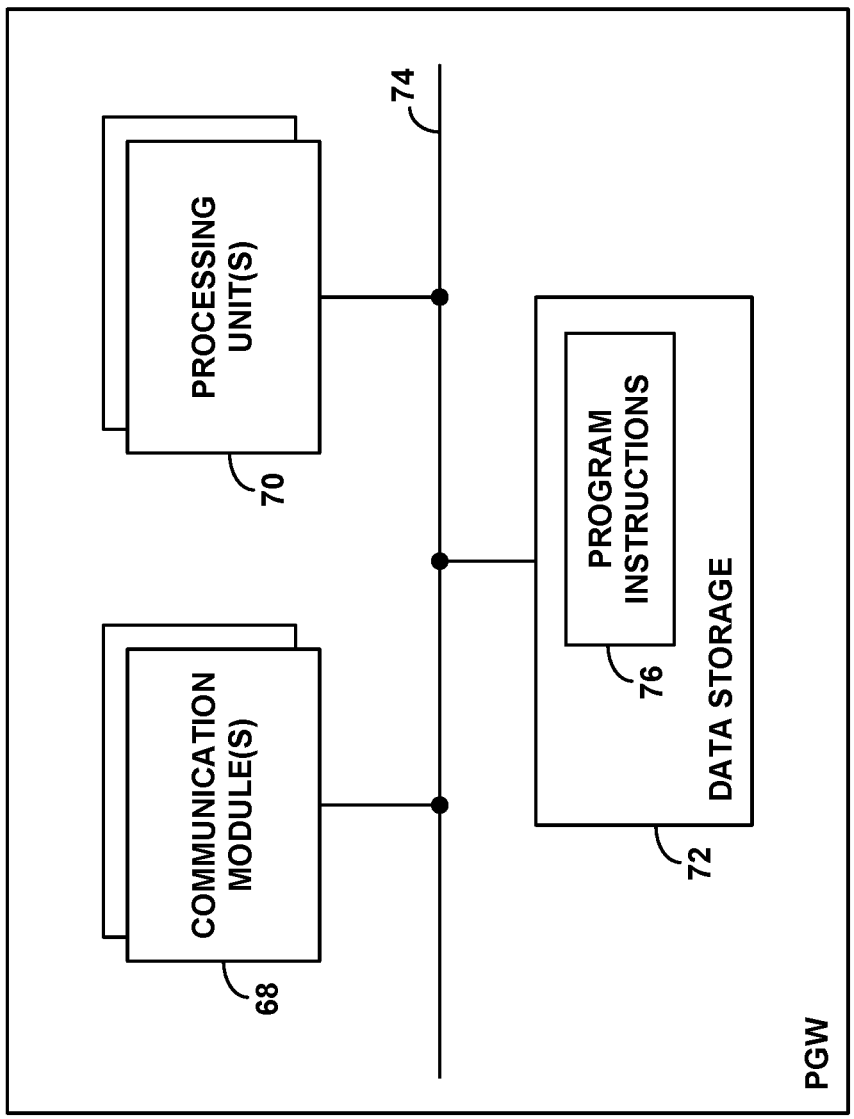
FIG. 5 is a simplified block diagram of an example network entity operable in accordance with the disclosure.

Finally, FIG. 5 is a simplified block diagram of an example PWG, showing some of the components that can be included in such an entity to facilitate implementing the operations discussed above. As shown in FIG. 5, the PGW includes one or more communication modules 68, one or more processing units 70, and non-transitory data storage 72, all of which may be integrated together in various ways and/or coupled together by a system bus, network, or other connection mechanism 74.

Communication module(s) 68 may function to provide for communication with various other network entities, such as to facilitate setting up a dedicated bearer for instance. The communication modules 68 may take on various forms and may include, for instance, Ethernet interfaces though which to communicate with other network entities.

Processing unit(s) 70 may then comprise one or more general purpose processors (e.g., microprocessors) and/or one or more special-purpose processors (e.g., application specific integrated circuits and/or digital signal processors) configured to carry out various operations described herein. And data storage 72 may comprise one or more volatile and/or non-volatile storage components, such as magnetic, optical, or flash storage, and may be integrated in whole or in part with processing unit(s) 70. As shown, data storage may also hold program instructions 76, which may be executable by processing unit(s) 70 to carry out various operations described herein.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for managing air interface communication between a base station and a first user equipment device (UE) served by the base station, wherein the base station is a donor base station and the first UE is a relay user equipment device (relay-UE) configured to provide wireless backhaul connectivity for a relay base station, the method comprising:
    initiating setup of a dedicated bearer connection between the first UE and the base station;
    detecting failure of the initiated setup of the dedicated bearer connection;
    determining that at least a threshold extent of dedicated bearer connections initiated after the detected failure have been successfully set up between the base station and one or more other different from the first UE;
    determining that the first UE is a relay-UE rather than an end-user UE; and
    based at least on (i) the determining that at least the threshold extent of dedicated bearer connections initiated after the detected failure have been successfully set up and (ii) the determining that the first UE is a relay-UE rather than an end-user UE, re-initiating setup of the dedicated bearer connection between the first UE and the base station.

2. The method of claim 1, further comprising receiving from the first UE a request to set up the dedicated bearer connection, wherein initiating setup of the dedicated bearer connection between the first UE and the base station is carried out in response to receiving the request to set up the dedicated bearer connection.

3. The method of claim 1, further comprising receiving from the first UE an attach request, wherein initiating setup of the dedicated hearer connection between the first UE and the base station is carried out in response to receiving the attach request.

4. The method of claim 1, further comprising establishing a default bearer connection between the first UE and the base station, wherein initiating setup of the dedicated bearer connection between the first UE and the base station comprises initiating setup of a dedicated bearer connection associated with the default bearer connection.

5. The method of claim 4, wherein the established default bearer connection is configured to carry user-plane communications between the first UE and the base station rather than control-plane communications between the first UE and the base station, and wherein initiating setup of the dedicated bearer connection between the first UE and the base station comprises initiating setup of a dedicated bearer connection that is configured to carry control-plane communications between the first UE and the base station rather than user-plane communications between the first UE and the base station.

6. The method of claim 1, wherein detecting failure of the initiated setup of the dedicated bearer connection comprises detecting that the base station caused the failure, and wherein re-initiating setup of the dedicated bearer connection between the first UE and the base station is further based on detecting that the base station caused the failure.

7. The method of claim 1, wherein the method is carried out by a packet-data-network gateway (PGW), and wherein the PGW is configured to provide connectivity between the first UE and a packet-switched network.

8. A packet-data-network gateway (PGW) operable in an access network, wherein the access network comprises a base station configured to serve a first user equipment device (UE) over an air interface, wherein the base station is a donor base station and the first UE is a relay user equipment device (relay-UE) configured to provide wireless backhaul connectivity for a relay base station, and wherein the PGW is configured to provide connectivity between the first UE and a packet-switched network, the PGW comprising:
    a processing unit;
    non-transitory data storage; and
    program instructions stored in the non-transitory data storage and executable by the processing unit to cause the PCW to carry out operations,
    wherein the operations include initiating setup of a dedicated bearer connection between the first HE and the base station,
    wherein the operations further include detecting failure of the initiated setup of the dedicated bearer connection,
    wherein the operations further include determining that at least a threshold extent of dedicated bearer connections initiated after the detected failure have been successfully set up between the base station and one or more other UEs different from the first UE,
    wherein the operations further include determining that the first UE is a relay-UE rather than an end-user UE, and
    wherein the operations further include, based at least on (i) the determining that at least the threshold extent of dedicated bearer connections initiated after the detected failure have been successfully set up and (ii) the determining that the first UE is a relay-HE rather than an end-user UE, re-initiating setup of the dedicated bearer connection between the first UE and the base station.

9. The PGW of claim 8, wherein the operations further include receiving from the first UE a request to set up the dedicated bearer connection, and wherein initiating setup of the dedicated bearer connection between the first UE and the base station is carried out in response to receiving the request to set up the dedicated bearer connection.

10. The PGW of claim 8, wherein the operations further include detecting an attach request sent from the first UE to the base station, and wherein initiating setup of the dedicated bearer connection between the first LTE and the base station is carried out in response to detecting the attach request.

11. The PGW of claim 8, wherein the operations further include establishing a default bearer connection between the first UE and the base station, wherein initiating setup of the dedicated bearer connection between the first UE and the base station comprises initiating setup of a dedicated bearer connection associated with the default bearer connection.

12. The PGW of claim 11, wherein the established default bearer connection is configured to carry user-plane communications between the first UE and the base station rather than control-plane communications between the first LTE and the base station, and wherein initiating setup of the dedicated bearer connection between the first UE and the base station comprises initiating setup of a dedicated bearer connection that is configured to carry control-plane communications between the first UE and the base station rather than user-plane communications between the first LE and the base station.

13. The PGW of claim 8, wherein detecting failure of the initiated setup of the dedicated bearer connection comprises detecting that the base station caused the failure, and wherein re-initiating setup of the dedicated bearer connection between the first UE and the base station is further based on detecting that the base station caused the failure.

14. A method operable in an access network comprising a donor base station and a relay, wherein the relay comprises a relay user equipment device (relay-UE) and a relay base station, wherein the donor base station is configured to serve the relay-UE over an air interface defining a wireless backhaul connection for the relay, and wherein the relay base station is configured to serve one or more UEs, the method comprising:

detecting an attach request sent from the relay-UE to the donor base station;

responsive to detecting the attach request, initiating setup of (i) a default bearer connection for user-plane traffic communicated between the relay-UE and the donor base station and (ii) a dedicated bearer connection for control-plane traffic communicated between the relay-UE and the donor base station;

detecting failure of the initiated setup of the dedicated bearer connection;

determining that at least a threshold extent of dedicated bearers initiated after the detected failure have been successfully set up between the donor base station and one or more other UEs different from the relay-UE;

determining that the relay-UE is a relay-UE rather than an end user UE; and based at least on (i) the determining that at least the threshold extent of dedicated bearers initiated after the detected failure have been successfully set up and (ii) the determining that the relay-UE is a relay-UE rather than an end user UE, re-initiating setup of the dedicated bearer connection for control-plane traffic communicated between the relay-UE and the donor base station.

15. The method of claim 14, further comprising determining that the default bearer connection between the relay-UE and the donor base station is successfully set up, and wherein initiating setup of the dedicated bearer connection between the relay-UE and the donor base station is carried out responsive to determining that the default bearer connection is successfully set up.

16. The method of claim 14, wherein detecting failure of the initiated setup of the dedicated bearer connection comprises detecting that the donor base station caused the failure, and wherein re-initiating setup of the dedicated bearer connection between the relay-LE and the donor base station is further based on detecting that the donor base station caused the failure.

* * * * *